United States Statutory Invention Registration [19]

[11] Reg. Number: H474

Taylor

[43] Published: Jun. 7, 1988

[54] OPTICAL TRANSVERSAL FIBER WITH REFLECTIVE TAPS

[75] Inventor: Henry F. Taylor, Alexandria, Va.

[73] Assignee: United States of America, Washington, D.C.

[21] Appl. No.: 809,068

[22] Filed: Oct. 25, 1985

[51] Int. Cl.[4] ..... G02B 6/34; G02B 5/18

[52] U.S. Cl. ..... 350/96.19; 350/162.22

[56] References Cited

PUBLICATIONS

D. K. W. Lam and B. K. Garside, Publication, Applied Optics, vol. 20, No. 3, Feb. 1, 1981, pp. 440–445, "Characterization of Single-Mode Optical Fiber Filters".

B. S. Kawasaki et al., Optics Letters, vol. 3, No. 2, Aug. 1978, pp. 646–649, "Narrow-Band Bragg Reflectors in Optical Fibers".

Zhong-Yi Yin et al., Applied Optics, vol. 22, No. 24, Dec. 15, 1983, "Photo-Induced Grating Filters in $GeO_2$ Thin-Film Waveguides."

K. O. Hill et al., Appl. Physics. Lett. 32(10), May 15, 1978,. pp. 647–649, Photosensitivity in Optical Fiber Waveguides: Application to Reflection Filter Fabrication.

*Primary Examiner*—Stephen C. Buczinski

*Assistant Examiner*—Linda J. Wallace

*Attorney, Agent, or Firm*—Robert F. Beers; William T. Ellis

[57] ABSTRACT

A method and means for forming an optical transversal filter and the optical transversal filter itself. The optical transversal filter comprises an optical fiber with a plurality of short reflective phase gratings disposed therein, with each reflective phase grating comprising a periodic variation of the refractive index of the optical fiber. These reflective phase gratings are disposed at predetermined positions along the length of the optical fiber and each reflective phase grating has a predetermined reflectance in order to reflect a predetermined relative amplitude of the light propagating in a first direction within the optical fiber to thereby counterpropagate back along the optical fiber. Modulated light source means are provided for directing light into one end of the optical fiber, and means for detecting light are provided to detect the light reflected by the plurality of reflective phase gratings. The predetermined positions of the plurality of reflective phase gratings and the individual reflectances of the plurality of reflective phase gratings are set in order that the light reflected by each of the reflective phase gratings is summed in light detecting means to yield a desired transversal filter function. The reflective phase gratings are written into the optical fiber core by means of two short counterpropagating coherent light pulses. The precise locations of these reflective phase gratings are determined by changing the optical length that either the forward-propagating or the counterpropagating pulse must traverse, thereby changing the location where these two pulses overlap in the optical fiber.

22 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTICAL TRANSVERSAL FIBER WITH REFLECTIVE TAPS

BACKGROUND OF THE INVENTION

The present invention is directed generally to the field of transversal filters, and more particularly to optical transversal filters with very high bandwidth.

There is considerable interest in the study and fabrication of optical waveguide filters for light-wave communications. Optical fibers are the desired optical waveguide of choice in such optical filters because they are capable of storing signals with very high bandwidths for very long delay times. Bandwidths of several gigahertz and delay times as high as 1 msec have been achieved. These figures are far in excess of those achievable with conventional acoustic wave delay lines. In this regard, time-bandwidth products of $10^6$ have been achieved with fiber optic technology vs. time-bandwidth products of only $10^4$ with acoustic wave devices.

The problem with implementing complex filter functions with fiber delay line technology is that the delay lines can support only a limited number of direction couplers for tapping or removing part of the signal power from the fiber delay line. Each tap introduces some optical loss into the line, so that the maximum practical number of taps is on the order of 15 to 20. This loss occurs because the taps must be individually spliced into the line with the optical matching problems attendant thereto. Moreover, such splicing is a time-consuming and expensive process. Finally, for most signal processing applications, all of the light from the taps is preferably sensed by a single photodetector in order to avoid detector differences and different delay times. In order to obtain high-speed operation, the single detector must have a very small area. In this regard, the detector area is proportional to the detector capacitance. Accordingly, a large detector area would lead to a large RC time constant, which would limit the speed of the detector. However, it is impossible to use a small detector to collect the light from a large number of separate optical fibers. Thus, it is presently possible to utilize only a very small part of the time-bandwidth capacity of the optical fibers for forming optical filters because of these practical limitations on the number of taps.

OBJECTS OF THE INVENTION

Accordingly, it is an object of the present invention to form an optical transversal filter without using any optical splicing taps.

It is a further object of the present invention to form a transversal filter in a single length of optical fiber without using splicing taps.

Other objects, advantages, and novel features of the present invention will become apparent from the detailed description of the invention, which follows the summary.

SUMMARY OF THE INVENTION

Briefly, the foregoing objects are achieved by an optical transversal filter comprising an optical fiber for propagating light, with the optical fiber having a first and second ends and a core made from a core material which has a non-linear interaction with light such that a grating is formed at certain light amplitudes; and coherent light source means for providing, for a predetermined period of time, coherent light pulses to propagate in the optical fiber in a first direction, with the coherent light source means being adjustable to provide different amplitude coherent light pulses. This transversal filter further comprises means for causing the coherent light pulses to counterpropagate in the optical fiber in a direction opposite to the first direction to thereby interfere with the pulses propagating in the first direction such that a first reflective phase grating is formed at a location in the optical fiber where the propagating and counterpropagating pulses overlap; means for changing the location where the propagating and counter propagating pulses overlap in the optical fiber to thereby form additional reflective phase gratings at different predetermined locations in the optical fiber with the coherent light pulses utilized to form each different reflective phase grating being adjusted in amplitude by the coherent light source means to provide desired reflectance values; modulated light source means for providing light which is to be operated on by the transversal filter to propagate in the optical fiber and then to be reflected back along the optical fiber by the first and additional reflective phase gratings in accordance with the desired reflectance values of those reflective phase gratings; and means for detecting the light reflected back by the first and additional phase gratings.

In one embodiment, the means for causing the coherent light to counterpropagate comprises a first optical path; a reflector at one end of the optical path for reflecting light propagating in the optical path into the second end of the optical fiber; means for changing the optical length of the first optical path; and a first beam splitter for dividing the coherent light pulse from the coherent light source means into a first and second components and directing the first component into the first end of the optical fiber and directing the second component to propagate in the first optical path toward the optical reflector, wherein light reflected from the optical reflector is directed into the second end of the optical fiber to counterpropagate therein, with the means for changing the optical length of the first optical path being adjusted to cause propagating and counterpropagating pulses to overlap and form the reflective phase gratings at predetermined locations in the optical fiber. In this embodiment, the optical path length changing means may comprise means for moving the reflector to increase or decrease the length of the optical path.

In another embodiment of the present invention, the coherent light source means may comprise means for generating a first and a second consecutive light pulses separated in time by a predetermined amount in order to form each reflective phase grating. The means for causing the coherent light to counterpropagate may comprise a reflector disposed at approximately the second end of the optical fiber such that the first light pulse is reflected by the reflector so that it counterpropagates in the optical fiber and overlaps with the propagating second light pulse to form the reflective phase grating, with the location of the reflective phase grating being determined by the predetermined time separation between the first and second pulses and the location of the reflector. In this embodiment, the location changing means may include means for moving the reflector toward or away from the second end of the optical fiber. In the alternative, the location changing means may include means for changing the predetermined time separation between the first and second light pulses to thereby cause the propagating and counterpropagating pulses to overlap at a different predetermined location.

DETAILED DESCRIPTION OF THE PREFERRED EMBODIMENT

The present invention is based on the discovery of a method and means for forming short localized phased gratings having wide reflectance bandwidths in an optical fiber via the interference therein of short wide bandwidth propagating and counterpropagating optical pulses. The present invention discloses a method and means for forming these localized phased gratings at arbitrary positions within the optical fiber. The arbitrary positions of these localized phase gratings are obtained by adjusting the optical length that either the propagating or the counterpropating pulse must travel prior to the pulse overlap which forms a given localized phase grating. It has been discovered that by forming a series of these localized phase gratings at predetermined positions along the length of the fiber, and by providing each of these phase gratings with predetermined reflectances, then the resulting sum of the reflected light from this series of localized phase gratings can be designed to yield a transversal filter function.

Figure 1:
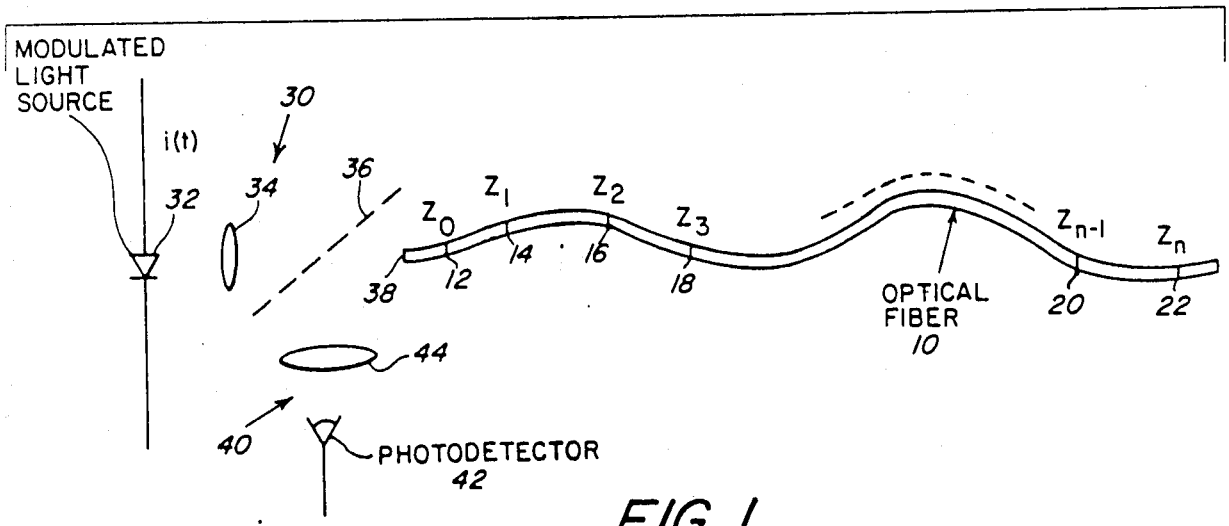
FIG. 1 is a schematic diagram of the optical transversal filter of the present invention.

Referring now to FIG. 1, there is shown a preferred embodiment of the transversal filter of the present invention. The basic transversal filter comprises an optical fiber 10 which has incorporated in it a series of reflectors 12, 14, 16, 18, 20, and 22, at the locations $Z_0$, $Z_1$, $Z_2$, $Z_3$, . . . $Z_{N-1}$, $Z_N$, respectively. Each of these reflectors 12–22 have individual reflectances $R_0$, $R_1$, $R_2$, $R_3$, $R_{N-1}$, $R_N$, respectively. The locations for reflectors 12–22 and the individual reflectances $R_0$–$R_n$ of those reflectors are chosen in order that light reflected from each those reflectors, when summed together, will yield a desired transversal filter function.

A modulated light source means 30 is provided in order to direct light which is to be operated on by the transversal filter into one end of the optical fiber 10. In the embodiment shown in FIG. 1, the modulated light source means comprises a light emitting diode 32 which is modulated in accordance with an input electrical signal i(t), in combination with a focusing lens 34 and a beamsplitter 36. By way of example, the light emitting diode 32 may be implemented by a Hitachi Model HLP 1400 diode laser. The focusing lens 34 operates to focus the light from the light emitting diode 32 through the beamsplitter 36 onto a first end 38 of the optical fiber 10. The beamsplitter 36 operates to transmit approximately 50% of the light from the light emitting diode 32 into the end 38. As this light propagates along the optical fiber 10, each of the reflectors 12–22 reflects a certain portion of that light back toward the first end 38 of the optical fiber.

Means 40 is provided for detecting and summing light reflected by each of the plurality of reflectors 12–22. This light detecting means 40 comprises, in the embodiment shown in FIG. 1, a photodetector 42, a focusing lens 44, and the beamsplitter 36. Because each of the reflectors 12–22 has a different location, and a predetermined reflectance, the individual reflected light components from this plurality of reflectors will propagate back through the first end 38 and will reach the photodetector 42 via the beamsplitter 36 and the focusing lens 44 to be summed thereby. The photodetector 42 generates an electrical signal 0(t) which represents the output of the optical fiber transversal filter 10. This electrical output can be written $$0(t) = K \sum_{n=0}^{N} R_n \alpha_n^2 s(t - \tau_n),$$

where $\tau_n = 2Z_n/v_g$, where $v_g$ is the group velocity of the light in the fiber, $\alpha_n$ is the total transmission of the fiber to the reflector location $z_n$, and K represents the optical-to-electrical conversion loss, the fiber input and coupling losses, and other sources of optical loss external to the fiber.

It is clear from a review of the equation for 0(t), that the electrical output of the photodetector 42 represents that of a transversal filter, with the tap weights of $\alpha_n^2 R_n$ and with tap locations in the temporal domain of $\tau_n$. If the tap weights, i.e., the individual reflectances $R_n$, and the tap locations, i.e., the locations of the individual reflectors $z_0$–$z_n$, can be chosen arbitrarily, it is possible to produce a generalized transversal filter for performing matched filtering functions as well as for generating complex waveforms.

The key to producing a practical filter of the type illustrated in FIG. 1 is the ability to produce the reflectors at the desired locations, with controllable reflectances, and with low scattering of optical power out of the core of the optical fiber 10. In this regard, it is known that long reflective gratings can be formed in certain optical fibers by interfering counterpropagating optical pulses. In this regard, see the references B. S. Kawasaki et al., "Narrow-band Bragg Reflectors in Optical Fibers," Optics Letters 3, 66 (1978); K. O. Hill et al., "Photosensitivity in Optical Fiber Waveguides: Applications to Reflection Filter Fabrication," Applied Physics Letters 32, 647 (1978); D. K. W. Lam and B. K. Garside, "Characterization of Single Mode Optical Fiber Filters," Applied Optics 20, 440 (1981); Z. Y. Yin et al., "Photo-Induced Grating Filters in $GeO_2$ Thin Film Waveguides," Applied Optics 22, 4088 (1983). These references disclose that reflective gratings can be written across the entire length of single mode optical fibers and in optical waveguides on planar substrates by means of a standing-wave pattern produced by a continuous wave laser beam in an optical fiber core. These references note that a non-linear interaction of light with the material of the fiber core gives rise to a periodic variation of the refractive index, i.e., a phase grating, in the fiber core material. This standing wave pattern used to write the long reflective phase grating throughout the length of the optical fiber is produced by the interference of a forward-propagating light wave with light reflected from the far end of the fiber These phase gratings produced with the continuous wave laser beam standing-wave pattern are formed across the entire length of the fiber and accordingly produce narrow band reflectors. These long gratings reflect close to 100% of the incident light in a narrow frequency bandwidth and these grating persist for a significant period of time after the laser beam has been used to write them into the fiber core.

It has been discovered that if short optical pulses are used instead of continuous-wave light, localized refective phase gratings which are short in length and localized to a specific position in the optical fiber can be formed. These short localized reflective phase gratings will have very wide bandwidths. In essence, the bandwidth of these localized short reflective phase gratings will depend on the spatial extent of the grating, i.e., the shorter the grating length, the wider the bandwidth. The reflective phase grating bandwidth may be viewed as being equivalent to the bandwidth of the pulses used to write the reflective phase grating.

Figure 2:
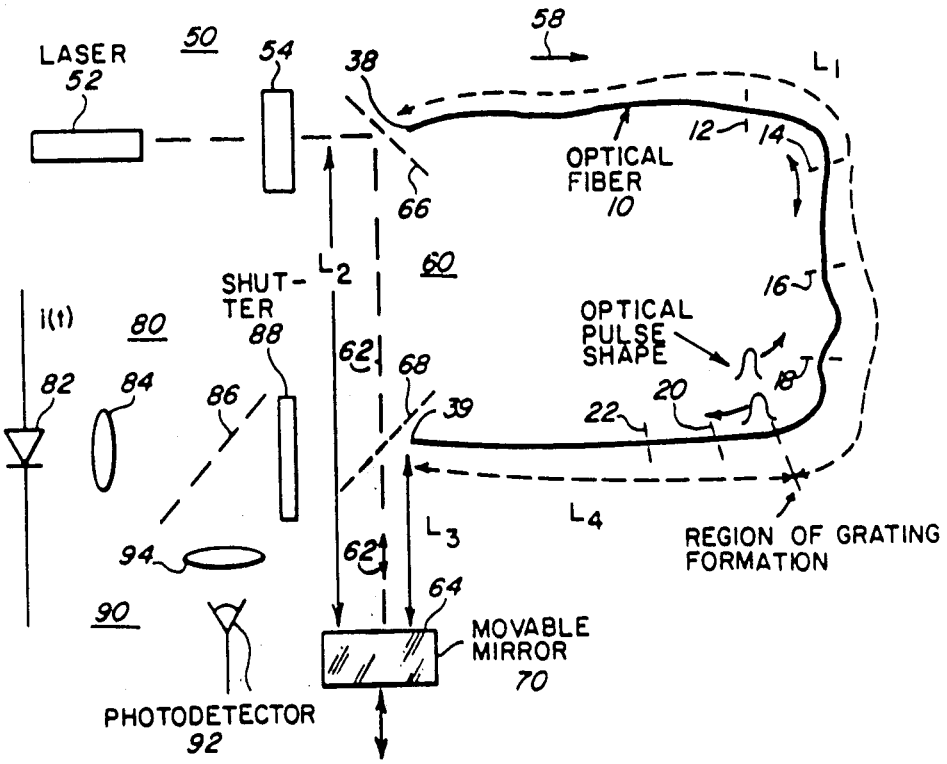
FIG. 2 is a schematic diagram of a means for forming the optical transversal filter of the present invention.

FIG. 2 discloses one embodiment of a method and means for forming a series of short localized reflective phase gratings at arbitrary positions throughout an optical fiber. Referring now to FIG. 2, an optical fiber 10 is chosen with a core made from a core material which has a non-linear interaction with light such that light of a certain amplitude will cause a periodic variation of the refractive index of the core, i.e., a reflective phase grating. In a preferred embodiment, the optical fiber may be an $SiO_2$-based single mode fiber with a $GeO_2$ doped core.

A coherent light source means 50 is provided for directing coherent light pulses to propagate in the optical fiber 10. In the embodiment shown in FIG. 2, the coherent light source means comprises a pulsed laser 52 disposed to direct a beam of laser light into the first end 38 of the optical fiber 10. A shutter 54 is disposed between the laser 52 and the first end 38 of the optical fiber 10.

A wide variety of lasers may be utilized to implement the present invention. By way of example, a dye laser, Model 375, by Spectra Physics, may be utilized in combination with an Argon ion pumping laser, Model 171-09, by Spectra Physics. In general, the laser coherence lengths should be equal to or greater than the length of the desired reflective phase grating. The laser 52 may be turned on and off in order to obtain the short pulses to obtain the localized reflective phase gratings. However, in some cases it may not be practical to turn the laser on and off. Accordingly, the shutter 54 is included in order to control the length and the timing of the pulses which are to be applied to the optical fiber 10. The shutter 54 is also used to prevent gratings from being formed during positioning adjustment operation.

As noted above, the reflective phase gratings are obtained by interfering a forward-propagating short laser pulse with a counterpropagating short laser pulse. Accordingly, means 60 are provided for causing the coherent light pulses from the laser 52 to counterpropagate in the optical fiber 10 in a direction opposite to a first direction 58 through the fiber. In the embodiment shown in FIG. 2, the means 60 for causing the coherent light to counterpropagate comprises a first optical path 62, a reflector 64 disposed at one end of the first optical path 62 for reflecting light propagating in the first optical path 62 into a second end 39 of the optical fiber 10, and a first beamsplitter 66 and a second beamsplitter 68. The first beamsplitter 66 is disposed after the shutter 54 between the laser 52 and the first end 38 of the optical fiber 10. The first beamsplitter 66 divides the coherent light pulses from the laser 52 into a first and second components, and directs the first component into the first end 38 of the optical fiber 10, while directing the second component to propagate in the first optical path 62 toward the optical reflector 64. The second beamsplitter 68 is disposed in the first optical path 62 at an angle such that it directs a portion of the light reflected from the optical reflector 64 into the second end 39 of the optical fiber 10 to counterpropagate therein. A means 70 for changing the location where the propagating and counterpropagating pulses overlap in the optical fiber 10 is provided to thereby determine the location where the pulse overlap occurs such that the position of each of the reflective phase gratings may be arbitrarily chosen. In the embodiment shown in FIG. 2, the means 70 for changing the location of the pulse overlap is realized simply by a translating stage connected to the optical reflector 64 for moving this optical reflector 64 to either increase or decrease the length of the optical path 62. There are a variety of mechanical translater stages currently available including, by way of example, the linear translation stage Model GV 88 by Klinger Scientific Corporation. Note that although a specific example for an optical path length changing means has been provided, i.e, a mechanical translation device, the optical path length changing means may be implemented in a variety of other electrical and optical configurations.

It can be seen from FIG. 2 that the path for the forward-propagating pulse in the first direction 58 has a path length of $L_1$. Likewise, the counterpropagating pulse has a path length of $L_2+L_3+L_4$. At the location where $L_1=L_2+L_3+L_4$, the center of the reflective phase grating is located.

In operation, coherent light pulses from the coherent light source means 50 are directed to the beamsplitter 66. The beamsplitter 66 directs a first component of approximately 50% of the light pulse into the first end 39 of the optical fiber 10 in the first direction 58 therein. Likewise, the beamsplitter 66 directs a second component of the light pulse along the first optical path 62, through the second beamsplitter 68, to the reflector 64 at one end of the first optical path 62. The reflector 64 reflects this second component of the optical pulse back toward the second beamsplitter 68. The second beamsplitter 68 directs this reflected second component into the second end 39 of the optical fiber 10 to counterpropagate therein in a direction opposite to the first direction 58. The forward-propagating pulse and the counterpropagating pulse form an interference pattern only in the region of the optical fiber 10 where the pulses overlap. This overlap region is where the reflective phase grating will be produced due to the non-linear interaction of the propagating and counterpropagating pulses at this point in the fiber. The length $L_g$ of the phase grating will be proportional to $v_g\tau$ where $\tau$ is the pulsewidth and $v_g$ is the group velocity of the light in the optical fiber 10. By way of example, if $\tau=10$ psec ($10^{-11}$ seconds) and $v_g=2\times10^{10}$ cm/sec ($v_g=c/n_g$, with $c=3\times10^{10}$ cm/sec and $n_g$ being the group index of the fiber), then $L_g$ is approximately equal to 2 mm. The position of the center of the phase grating will be determined by the position in the optical fiber 10 where the optical path lengths for the two interfering pulses are equal. Accordingly, by adjusting the length of one of the optical paths, it is possible to produce reflective phase gratings at different locations in the optical fiber 10. In the embodiment of FIG. 2, the length of the first optical path 62 which is used to direct the second component of the light pulse into the optical fiber 10 to counterpropagate therein is adjusted via the reflector 64 connected to the means 70 for moving the reflector to increase or decrease the optical path length. In one embodiment, this reflector 64, which may be realized by a mirror, may simply be attached to a computer-controlled translation stage 70 which is synchronized with the pulses being generated by the coherent light means source 50. Accordingly, the selection of the reflective phase grating locations, $z_n$, within the optical fiber 10 can be produced automatically under computer control.

The refractive index change $\Delta n$ of the reflective phase gratings can be written as $$\Delta n = \Delta n_0 \cos\left(\frac{4\pi n z}{\lambda}\right),$$

where $\Delta n_0$ is the amplitude of the refractive index variation, and $\lambda$ is the center wavelength of the laser 52, and n is the fiber core refractive index.

The reflectance $R_g$ of the grating is approximately equal to $$\left(\frac{\Delta n_0 L_g}{\lambda}\right)^2,$$

where $L_g$ is the length of the reflective phase grating. The reflectance of an individual reflective phase grating may be adjusted simply by varying the power of the coherent light pulses used to produce that particular phase grating. In the alternative, the power of the coherent light pulses may be kept constant, but the number of pairs of propagating and counterpropagating pulses utilized in order to form a particular reflective phase grating at a given location may be varied to thereby vary the reflectance at this location. In this regard, the higher the higher total combined amplitude of the light pulses at the pulse overlap location within the optical fiber, the higher the reflectance value within the optical fiber core. As a further alternative, the reflectance may be varied by varying the length of the reflective phase grating. This length variation of the phase grating would be accomplished by simply varying the width of the individual coherent light pulses generated by the coherent light source means 50. This method of varying the reflectances by varying the pulse widths will also affect the bandwidth for the particular reflective phase grating which is being written. Accordingly, in some cases this method of varying the reflectance of a given phase grating may not be desirable.

In order to illustrate the values encountered using the equation for the reflectance $R_g$, the following example is provided. For $\Delta n_0 = 10^{-5}$, $L_g = 2$ mm, and $\lambda = 0.8$ micrometers, a value for $R_g$ of approximately $6.2 \times 10^{-4}$ is realized. As another example, for $\Delta n_0 = 10^{-4}$, $L_g = 2$ mm, and $\lambda = 0.8$ micrometers, a reflectance value $R_g$ of approximately 0.062 is realized.

It should be noted that the amount of reflectance for individual phase gratings in a series of reflective phase gratings in an optical fiber must be set depending on the total number of reflectances to be written in the optical fiber. For example, a series of highly reflective phase gratings will permit only a few reflective phase gratings in the optical fiber since little light will be propagating in the optical fiber after the first few of these highly reflective phase gratings. Weaker reflectances are needed if a large number of reflective phase gratings are desired. In this regard, a general rule is that the reflectance of the individual phase gratings should be approximately equal to the inverse of the number of reflective phase gratings to be written in the optical fiber. Accordingly, for the reflectance value examples given above, the filters would have 1600 and 16 taps, respectively.

Reflective phase gratings formed in germanium-doped fused silica typically remain fixed in the core of the optical fiber for between 24 and 48 hours. After this period of time, these reflective phase gratings formed by interference techniques bleached or decayed spontaneously at room temperature. Thus, the periodic rewriting of gratings may be necessary. However, for materials in optical fibers other than glasses, thermal fixing techniques have been used to successfully prevent bleaching of the phased gratings. For example, lithium niobate phased gratings have been fixed by heating the crystal for 20 to 30 minutes to 100° C. during or after the writing of the phase grating. See the reference J. J. Amodei, W. Phillips, and D. L. Staebler, "Improved Electrooptic Materials and Fixing Techniques for Holographic Recording," Applied Physics 11, 390 (1972). These phased gratings could be erased thermally by heating to 300° C. Similar thermal fixing and erasure techniques may also be applied in the case of fiber optic transversal filters.

In order to operate the present device as a transversal filter, a modulated light source means 80 is included for providing light to propagate in the optical fiber 10 which is to be operated on by the transversal filter. In FIG. 2, the modulated light source means 80 comprises a light emitting laser diode 82 for generating laser light modulated in accordance with a current signal, i(t), and directing that modulated light into one end of the optical fiber 10. The modulated light source means may be disposed to direct light into either one of the ends 38 or 39 of the optical fiber 10. In FIG. 2, the laser diode 82 is positioned to direct its modulated light into the second end 39 of the optical fiber 10. A lens 84 is disposed between the laser diode 80 and the second end 39 to focus light thereon. A beamsplitter 86 and a shutter 88 are disposed between the lens 84 and the end 39 of the optical fiber 10. The beamsplitter 86 splits the modulated light from the laser diode 82 into two components and directs one of the components through the shutter 88 to the second end 39. The shutter 88 is utilized in order to prevent light pulses from the coherent light source means 50 from being transmitted to the laser diode 82. Generally, the shutter 88 is closed only during the time when the reflective phase gratings are being written in the optical fiber 10.

Means 90 for detecting the light reflected back along the optical fiber 10 from the reflective phase gratings 12-22 is included in the circuit. In FIG. 2, the means 90 for detecting the reflected light comprises a photodetector 92 aligned with the beamsplitter 86 to obtain a component of the light reflected therefrom. A lens 94 is utilized to focus that light from the beamsplitter 86 onto the photodetector 92.

In operation of the device as a transversal filter, modulated light from the laser diode 82 is directed via the lens 84 through the beamsplitter 86, the open shutter 88, the beamsplitter 68, into the end 39 of the optical fiber 10. The reflective phase gratings 12-22 have been appropriately positioned at predetermined locations along the length of the optical fiber 10 and provided with predetermined reflectances such that each reflective phase grating will reflect a predetermined portion of the light propagating therein back along the optical fiber 10. This reflected light will be directed through the beamsplitter 68, the open shutter 88, and then a portion thereof will be reflected by the beamsplitter 86 onto the photodetector 92. The summation of all of the different components of reflected light from the reflective gratings 12-22 will yield a desired transversal filter function.

If the reflective phase gratings for the optical fiber 10 have been fixed permanently in the optical fiber, or if the reflective phase gratings only need to be fixed for 24 to 48 hours, then after the phase gratings have been written into the optical fiber 10, the phase grating writing structure including the laser 52, the shutters 54 and 88, the beamsplitters 66 and 68, and the movable mirror 64, may be removed. The transversal filter would then have the configuration shown in FIG. 1. However, it may be convenient to leave the optical fiber in the optical fiber writing apparatus in order to periodically renew the reflective phase gratings in the optical fiber when they begin to fade, or to write new reflective phase gratings in the optical fiber at different locations therein.

Figure 3:
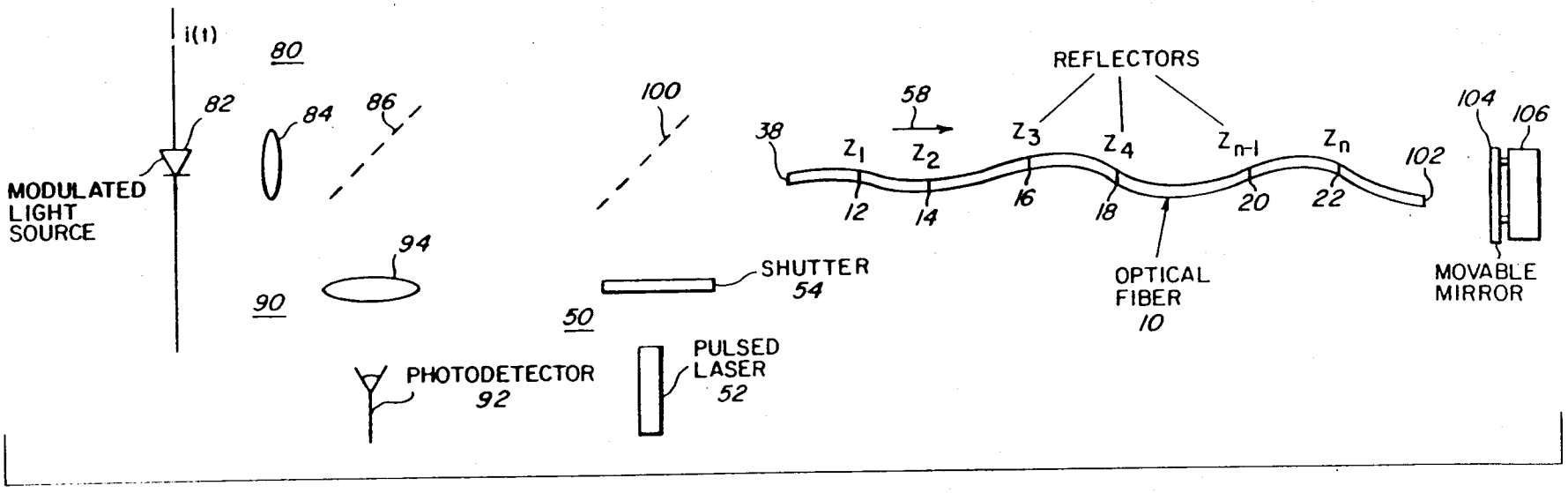
FIG. 3 is a schematic diagram of a second embodiment of a means for forming the optical transversal filter of the present invention.

Referring now to FIG. 3, a second embodiment is shown for writing the reflective phase gratings 12-22 into an optical fiber 10. In this configuration, a coherent light source means 50, comprised of a laser 52 and a shutter 54, is positioned in order to direct its coherent laser light into the first end 38 of the fiber 10 to propagate in the first direction 58. The coherent light source means 50 may be disposed to direct its light either directly into the end 38 of the optical fiber 10, or by way of a beamsplitter 100. The beamsplitter 100 is utilized in FIG. 3 in order to facilitate the placement of a modulated light source 80 and a detecting means 90.

Means are provided for causing the coherent light pulses to counterpropagate in the optical fiber 10 in a direction opposite to the first direction 58. By way of example, this counterpropagation causing means may be realized simply by a polished end at the opposite end 102 of the optical fiber 10 from the first end 38. In the alternative, a separate reflector 104 may be disposed approximately at the end 102 of the optical fiber 10. In the configuration of FIG. 3, two separate pulses are required from the coherent light source means 50 in order to obtain the reflective phase grating. These first and second consecutive light pulses must be separated in time by a predetermined amount. In operation, the first light pulse is directed by the coherent light source means 50 into the first end 38 of the optical fiber 10. This first pulse propagates along the optical fiber 10 until it is reflected at the end thereof by either a reflective end 102 or a separate reflector 104 adjacent to the end 102. This reflected first light pulse then counterpropagates in the optical fiber 10 back toward the first end 38. A predetermined time after this first light pulse has been generated, the coherent light source means 50 generates the second light pulse to forward-propagate in the optical fiber 10 in the first direction 58. This forward-propagating second pulse and the counterpropagating first pulse overlap in the optical fiber 10, with the location of the overlap being the location of the reflective phase grating. The precise location of this overlap is determined by the predetermined time separation between the first and second pulses and by the location of the reflector at the far end of the optical fiber 10.

Means for changing the location where the forward-propagating and counterpropagating light pulses overlap in the optical fiber are provided, and may be implemented in a variety of configurations. In one embodiment, this location changing means may simply be comprised of means for changing the predetermined time spacing separating the first and second light pulses generated by the coherent light source means 50. This time separation changing function can be accomplished either manually or by means of a simple timing circuit. In the alternative, the pulse overlap changing means may comprise means for changing the optical path length that the first light pulse must traverse before reaching the reflector. A variety of means are available in the art both electrical, mechanical, and electro-optical, for changing the optical path length. In the embodiment shown in FIG. 3, the optical path length changing means simply comprises a mechanical linear translation device 106 attached to the reflector mirror 104 for moving that reflector 104 toward or away from the far end 102 of the optical fiber 10 to thereby change the optical path length. In the case where a movable reflector 104 is utilized, the far end 102 of the optical fiber 10 would not be mirrored. Utilizing the movable reflector implementation, the location of the reflective phase grating would be controlled simply by moving the reflector 104 backward or forward.

As in FIG. 2, a modulated light source means 80 is disposed to direct modulated light which is to be operated on by the transversal filter to propagate into the end 38 of the optical fiber 10. This modulated light source means 80 again comprises a laser diode 82, a lens 84, and a beamsplitter 86. Likewise, means 90 is provided for detecting the light reflected back by all of the reflective phase gratings 12-22 in the optical fiber 10. This light detecting means 90 comprises a photodetector 92 and a lens 94, and is positioned in order to receive a portion of the light reflected back by the reflective phase gratings and split by the beamsplitter 86.

As noted previously, once the reflective phase gratings have been written into the optical fiber at their desired positions therein and with the desired reflectances, then the phase grating writing apparatus components 52, 54, 100, 104, and 106 may be removed. Then the modulated light source 80 provides its modulated light from the laser diode 82 through the lens 84 and the beamsplitter 86 into the optical fiber 10. The plurality of reflective phase gratings 12-22 each operate to reflect a portion of the light propagating therein back through the end 38 to the beamsplitter 86. The beamsplitter 86 then reflects a portion of these reflected components to the photodetector 92 for summing. This operation yields the transversal filter function.

The present design provides an optical transversal filter with very high bandwidth without the requirement for optical splices. All of the different transversal filter segments can be sensed by a single photodetector. Additionally, the total number of tap weights and tap locations is unlimited.

Obviously many modifications and variations of the present invention are possible in light of the above teachings. It is therefore to be understood that within the scope of the appended claims, the invention may be practiced otherwise than as specifically described.

What is claimed and desired to be secured by Letters Patent of the United States is:

1. An optical transversal filter capable of a very high bandwidth, comprising:

an optical fiber for propagating light, said optical fiber having a first and second ends and a core made from a core material which has a non-linear intersection with light such that a grating is formed at certain light amplitudes;

coherent light source means for providing, for a predetermined period of time, coherent light pulses to propagate in said optical fiber in a first direction therein;

means for causing said coherent light pulses to counterpropagate in said optical fiber in a direction opposite to said first direction to thereby interfere with said pulses propagating in said first direction such that a first reflective phase grating with a wide reflective bandwidth is formed at a location in said optical fiber where said propagating and counterpropagating pulses overlap;

means for changing the location where said propagating and counterpropagating pulses overlap in said optical fiber to thereby form additional reflective phase gratings at different predetermined locations in said optical fiber, with the total amplitude of the coherent light pulses utilized to form each different reflective phase grating being adjusted to provide desired reflectance values;

modulated light source means for providing light which is to be operated on by said transversal filter to propagate in said optical fiber and then to be reflected back along said optical fiber by said first and additional reflective phase gratings in accordance with the desired reflectance values of those reflective phase gratings; and means for detecting said light reflected back by said first and additional phase gratings.

2. An optical transversal filter as defined in claim 1, wherein said means for causing said coherent light to counterpropagate comprises:

a first optical path;

a reflector at one end of said optical path for reflecting light propagating in said optical path into said second end of said optical fiber;

a first beamsplitter for dividing the coherent light pulse from said coherent light source means into a first and second components and directing said first component into said first end of said optical fiber and directing said second component to propagate in said first optical path toward said optical reflector, wherein light reflected from said optical reflector is directed into said second end of said optical fiber to counterpropagate therein.

3. An optical transversal filter as defined in claim 2, wherein said coherent light source means includes a laser which is adjustable to provide different amplitude pulses.

4. An optical transversal filter as defined in claim 3, wherein said means for changing the location where said pulses overlap comprises optical path length changing means for adjusting the optical length of said first optical path to cause said propagating and counterpropagating pulses to overlap and form said reflective phase gratings at said predetermined locations in said optical fiber.

5. An optical transversal filter as defined in claim 4, wherein said optical path length changing means comprises means for moving said reflector to increase or decrease the length of said first optical path.

6. An optical transversal filter as defined in claim 1, wherein said coherent light source means comprises means for generating a first and second consecutive light pulses separated in time by a predetermined amount in order to form a reflective phase grating; and wherein said means for causing said coherent light to counterpropagate comprises a reflector disposed at approximately said second end of said optical fiber;

wherein said first light pulse is reflected by said reflector so that it counterpropagates in said optical fiber and overlaps with said propagating second light pulse to form said reflective phase grating, with the location of said reflective phase grating being determined by said predetermined time separation between said first and second pulses and the location of said reflector.

7. An optical transversal filter as defined in claim 6, wherein said location changing means comprises means for changing the optical path length that said first light pulse must traverse before reaching said reflector.

8. An optical transversal filter as defined in claim 7, wherein said optical path changing means includes means for moving said reflector toward or away from the second end of said optical fiber to thereby change the location where the propagating and counterpropagating pulses overlap.

9. An optical transversal filter as defined in claim 6, wherein said location changing means includes means for changing said predetermined time amount separating said first and second light pulses to thereby cause said propagating and counterpropagating pulses to overlap at a different predetermined location.

10. An optical transversal filter as defined in claim 9, wherein said coherent light source means comprises:

a laser;

means for directing light from said laser into said first end of said optical fiber; and a shutter disposed between said laser and said directing means for controlling when said laser light is directed into said optical fiber.

11. An optical transversal filter capable of very high bandwidth operation comprising:

an optical fiber for propagating light, said optical fiber including a plurality of short reflective phase gratings each having a wide reflective bandwidth, with each reflective phase grating comprising a periodic variation of the refractive index of said optical fiber, said reflective phase gratings being disposed at predetermined positions along the length of said optical fiber and with each reflective phase grating having a predetermined reflectance in order to reflect a predetermined relative amplitude of light propagating in a first direction within said optical fiber to thereby counterpropagate back along said optical fiber;

modulated light source means for directing light into one end of said optical fiber to propagate in said first direction; and means for detecting light reflected by said plurality of reflective phase gratings back along said optical fiber;

wherein said predetermined positions of said plurality of reflective phase gratings and the individual reflectances of said plurality of reflective phase gratings are set in order that the light reflected by each of said reflective phase gratings to counterpropagate back along said optical fiber is summed by said light detecting means to yield a desired transversal filter function.

12. A method for forming an optical fiber for use as a transversal filter, comprising the steps of:

generating and adjusting a coherent light source to provide light pulses of a predetermined width and a predetermined amplitude;

causing said coherent light pulses to propagate in a first direction and to counterpropagate back in a direction opposite to said first direction in an optical fiber having a core made from a material which has a non-linear interaction with light, such that a short periodic variation of the refractive index of the optical fiber, i.e., a reflective phase grating, is formed having a wide reflective bandwidth at a localized position in said optical fiber where said propagating and counterpropagating pulses overlap; and changing the location where said propagating and counterpropagating pulses overlap in said optical fiber to thereby form additional reflective phase gratings at different predetermined locations in said optical fiber, and with each new location, changing the total light amplitude at said new location from said overlapping coherent light pulses to provide a desired reflectance value for the reflective phase grating at this new location, such that light reflected from each of said reflective phase gratings at their predetermined reflectances will yield a desired transversal filter function when summed.

13. A method as defined in claim 12, wherein said causing step includes the steps of, for each individual reflective phase grating to be formed:

splitting a single short coherent light pulse into a first and second components;

directing said first light pulse component into one end of said optical fiber to propagate therein in said first direction, and directing said second light pulse component into the opposite end of said optical fiber to counterpropagate in said opposite direction therein; wherein one of said first or second light pulse components are directed through a variable optical path.

14. A method as defined in claim 13, wherein said location changing step comprises the step of changing the optical length of said variable optical path by a predetermined amount to thereby change the location where said propagating and counterpropagating pulses overlap and form said reflective optical grating.

15. A method as defined in claim 14, wherein said optical length changing step comprises the step of moving a mirror disposed in said variable optical path.

16. A method as defined in claim 12, wherein said causing step comprises the step of, for each individual reflective phase grating to be formed:

directing a first light pulse into one end of said optical fiber to propagate said first direction therethrough;

directing a second light pulse into said one end of said optical fiber at a predetermined time after said first light pulse to propagate in said first direction therein;

reflecting said first light pulse to counterpropagate in said optical fiber;

wherein said reflective phase grating is formed in said optical fiber where said first counterpropagating light pulse and said second propagating light pulse overlap, with the location of said reflective phase grating being determined by said predetermined time between said first and second light pulses and by the optical path length that said first pulse must traverse.

17. A method as defined in claim 16, wherein said location changing step comprises the step of changing the optical path length that said first pulse must traverse.

18. A method as defined in claim 16, wherein said location changing step comprises the step of disposing a reflector close to the other end of said optical fiber from said one end, and moving said reflector toward or away from said other end by a predetermined amount to thereby change the location where said first and second pulses overlap.

19. A method as defined in claim 16, wherein said location changing step comprises the step of changing said predetermined time between said first and second pulses to thereby change the location where said first and second pulses overlap.

20. A method as defined in claim 16, further comprising the steps of:

directing modulated light to be operated on by said transversal filter to propagate in said optical fiber and then to be reflected back along said optical fiber by said reflective phase gratings in accordance with the predetermined reflectances of those reflective phase gratings; and detecting said light reflected by all of said reflective phase gratings to obtain said desired transversal filter function.

21. A method as defined in claim 14 further comprising the steps of:

directing modulated light to be operated on by said transversal filter to propagate in said optical fiber and then to be reflected back along said optical fiber by said reflective phase gratings in accordance with the predetermined reflectances of those reflective phase gratings; and detecting said light reflected by all of said reflective phase gratings to obtain said desired transversal filter function.

22. A method for obtaining a transversal filter function, comprising the steps of:

directing modulated light into an optical fiber which contains a plurality of short wideband reflective phase gratings formed in the fiber core thereof, with each reflective phase grating comprising a periodic variation of the refractive index of said optical fiber, said reflective phase gratings being disposed at predetermined positions along the length of said optical fiber and with each reflective phase grating having a predetermined reflectance in order to reflect a predetermined relative portion of the amplitude of said modulated light back along said fiber; and detecting the modulated light reflected by said plurality of reflective phase gratings;

wherein said predetermined positions of said plurality of reflective phase gratings and the predetermined reflectances of said plurality of reflective phase gratings are chosen such that the sum of all of the light reflected by said reflective phase gratings detected in said detecting step yields a desired transversal filter function.

* * * * *